(12) United States Patent
Yoon et al.

(10) Patent No.: US 10,141,793 B2
(45) Date of Patent: Nov. 27, 2018

(54) METHOD AND DEVICE FOR IMPEDANCE MATCHING USING ISOLATED RESONATOR IN WIRELESS POWER TRANSMISSION SYSTEM

(71) Applicant: Samsung Electronics Co., Ltd., Suwon-si (KR)

(72) Inventors: Seungkeun Yoon, Suwon-si (KR); Ui Kun Kwon, Suwon-si (KR); Sang Joon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 15/134,525

(22) Filed: Apr. 21, 2016

(65) Prior Publication Data

US 2016/0233725 A1 Aug. 11, 2016

Related U.S. Application Data

(63) Continuation of application No. PCT/KR2014/009867, filed on Oct. 21, 2014.

(30) Foreign Application Priority Data

Oct. 21, 2013 (KR) .................. 10-2013-0125412

(51) Int. Cl.
 *H02J 50/90* (2016.01)
 *H02J 7/02* (2016.01)
 (Continued)

(52) U.S. Cl.
 CPC .............. *H02J 50/90* (2016.02); *H02J 7/025* (2013.01); *H02J 17/00* (2013.01); *H02J 50/12* (2016.02)

(58) Field of Classification Search
 CPC .................................. H02J 50/12; H02J 50/90
 See application file for complete search history.

(56) References Cited

U.S. PATENT DOCUMENTS

2010/0030304 A1  2/2010  Haubrich et al.
2011/0109167 A1  5/2011  Park et al.
(Continued)

FOREIGN PATENT DOCUMENTS

CN   203039384 U   7/2013
JP   2011-142748 A  7/2011
(Continued)

OTHER PUBLICATIONS

Benjamin H. Waters et al. "Adaptive Impedance Matching for Magnetically Coupled Resonators." *PIERS Proceedings*, Moscow, Russia, Aug. 19-23, 2012, pp. 694-701.
(Continued)

*Primary Examiner* — Jeffrey Shin
(74) *Attorney, Agent, or Firm* — NSIP Law

(57) ABSTRACT

A wireless power transmitter includes a source resonator configured to transmit wireless power by resonating with a target resonator, a first power supply configured to supply power to the source resonator, a first switch configured to turn ON/OFF a connection between of the source resonator to the first power supply, and a controller configured to match an impedance of the source resonator by estimating a distance between the source resonator and the target resonator.

27 Claims, 10 Drawing Sheets

(51) Int. Cl.
*H02J 17/00* (2006.01)
*H02J 50/12* (2016.01)

(56) References Cited

U.S. PATENT DOCUMENTS

| | | | |
|---|---|---|---|
| 2012/0004016 A1 | 1/2012 | Carpentier et al. | |
| 2012/0056487 A1* | 3/2012 | Choi | H02J 5/005 307/104 |
| 2012/0286582 A1* | 11/2012 | Kim | H02J 5/005 307/104 |
| 2012/0286726 A1* | 11/2012 | Kim | B60L 11/182 320/108 |
| 2013/0159956 A1 | 6/2013 | Verghese et al. | |

FOREIGN PATENT DOCUMENTS

| | | |
|---|---|---|
| JP | 4865001 B2 | 2/2012 |
| JP | 2012-135117 A | 7/2012 |
| KR | 10-2011-0009227 A | 1/2011 |
| KR | 10-2011-0050920 A | 5/2011 |
| KR | 10-2011-0122394 A | 11/2011 |
| KR | 10-2012-0126333 A | 11/2012 |
| KR | 10-2012-0129821 A | 11/2012 |
| KR | 10-2012-0138828 A | 12/2012 |
| KR | 10-2013-0013396 A | 2/2013 |
| KR | 10-2013-0041870 A | 4/2013 |

OTHER PUBLICATIONS

Ui Kun Kwon et al. "Synchronization Algorithm of Resonator Isolation System for Efficient Power and Data Transmission." *Global Communications Conference (GLOBECOM)*, IEEE, 2012, pp. 3970-3975 (pp. 3946-3951 in original publication).
International Search Report dated Jan. 16, 2015, in counterpart International Application No. PCT/KR2014/009867 (9 pages in Korean with English translation).
Written Opinion of the International Searching Authority dated Jan. 16, 2015, in counterpart International Application No. PCT/KR2014/009867 (15 pages in Korean with English translation).
Chinese Office Action dated Feb. 14, 2018, in corresponding Chinese Application No. 201480057950.6 (10 pages in English, 8 pages in Chinese).

* cited by examiner

METHOD AND DEVICE FOR IMPEDANCE MATCHING USING ISOLATED RESONATOR IN WIRELESS POWER TRANSMISSION SYSTEM

CROSS-REFERENCE TO RELATED APPLICATIONS

This application is a continuation of International Application No. PCT/KR2014/009867 filed on Oct. 21, 2014, which claims the benefit of Korean Patent Application No. 10-2013-0125412 filed on Oct. 21, 2013, in the Korean Intellectual Property Office, the entire disclosures of which are incorporated herein by reference for all purposes.

BACKGROUND

1. Field

This disclosure relates to a method and an apparatus for impedance matching using resonator isolation (RI) in a wireless power transmission system.

2. Description of Related Art

Research is being conducted into wireless power transmission to overcome a growing inconvenience of a need to supply wired power due to an increasing number of various electronic devices including a mobile terminal, and limitations of existing batteries. More particularly, research into near field wireless power transmission is garnering attention. In near field wireless power transmission, a distance between a transmission coil and a reception coil is considerably shorter than a wavelength of an operating frequency. A resonator isolation (RI) system is used for the near field wireless power transmission. The RI system based on a resonance property includes a source for supplying power and a target for receiving the power from the source. In recent times, continuous research is being conducted into more efficient power transmission.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmitter includes a source resonator configured to transmit wireless power by resonating with a target resonator; a first power supply configured to supply power to the source resonator; a first switch configured to turn ON/OFF a connection of the source resonator to the first power supply; and a controller configured to match an impedance of the source resonator by estimating a distance between the source resonator and the target resonator.

The controller may be further configured to control the wireless power transmitter to operate in a power transmission mode and an impedance matching mode.

The controller may be further configured to control a supply of power to the source resonator by controlling the first switch in the impedance matching mode.

The wireless power transmitter may further include a second power supply configured to supply power to the source resonator; and a second switch configured to turn ON/OFF a connection of the source resonator to the second power supply; and the controller may be further configured to control a supply of power to the source resonator by controlling the second switch in the impedance matching mode.

The controller may include an envelope detector configured to detect an envelope of the wireless power transmitted by the source resonator in the impedance matching mode; a distance estimator configured to estimate a distance between the source resonator and the target resonator based on the envelope; and an impedance matcher configured to match the impedance of the source resonator based on the estimated distance.

The distance estimator may be further configured to estimate a coupling coefficient or a mutual inductance between the source resonator and the target resonator based on a time difference between at least two points of the envelope.

The at least two points may include at least two of at least one peak point at which an amplitude of the envelope reaches a peak; at least one minimum point at which the amplitude of the envelope reaches a minimum; and a start point at which the source resonator and the target resonator start the resonating in the impedance matching mode.

The controller may be further configured to control the wireless power transmitter to operate in the impedance matching mode based on predetermined intervals or a predetermined power transmission efficiency.

The controller may be further configured to end the impedance matching mode in response to the resonating of the target resonator and the source resonator being suspended in the impedance matching mode.

The controller may be further configured to match the impedance of the source resonator in the impedance matching mode based on a resonance frequency between the source resonator and the target resonator in the power transmission mode.

In another general aspect, a wireless power receiver includes a target resonator configured to receive wireless power by resonating with a source resonator; a load configured to receive power from the target resonator; and a controller configured to match an impedance of the target resonator by estimating a distance between the source resonator and the target resonator.

The controller may be further configured to control the wireless power receiver to operate in a power transmission mode and an impedance matching mode.

The controller may be further configured to control the wireless power receiver to operate in the impedance matching mode in response to a change in the wireless power received by the target resonator.

The wireless power receiver may further include a switch configured to turn ON/OFF a connection of the target resonator to the load; and the controller may be further configured to turn OFF the switch in the impedance matching mode.

The controller may include an envelope detector configured to detect an envelope of the wireless power received by the target resonator in the impedance matching mode; a distance estimator configured to estimate a distance between the source resonator and the target resonator based on the envelope; and an impedance matcher configured to match an impedance of the target resonator based on the estimated distance.

The distance estimator may be further configured to estimate a coupling coefficient or a mutual inductance between the source resonator and the target resonator based on a time difference between at least two points of the envelope.

The at least two points may include at least two of at least one peak point at which an amplitude of the envelope reaches a peak; at least one minimum point at which the amplitude of the envelope reaches a minimum; and a start point at which the source resonator and the target resonator start the resonating in the impedance matching mode.

In another general aspect, a wireless power transmitter includes a source resonator configured to transmit wireless power by resonating with a target resonator in response to power supplied to the source resonator; a switch configured to interrupt the power from being supplied to the source resonator; and a controller configured to match an impedance of the source resonator based on an envelope of the wireless power transmitted by the source resonator in response to the switch interrupting the power from being supplied to the source resonator.

The controller may be further configured to control the switch not to interrupt the power from being supplied to the source resonator during a power transmission mode, control the switch to interrupt the power from being supplied to the source resonator during an impedance matching mode, and match the impedance of the source resonator during the impedance matching mode.

The controller may be further configured to control the switch to interrupt the power from being supplied to the source resonator a plurality of times during the impedance matching mode.

The controller may be further configured to estimate a coupling coefficient or a mutual inductance between the source resonator and the target resonator based on a time difference between two points of the envelope, and match the impedance of the source resonator based on the estimated coupling coefficient or mutual inductance.

The time difference may change as a distance between the source resonator and the target resonator changes.

The wireless transmitter may further include a lookup table (LUT) storing a relationship between the coupling coefficient or the mutual inductance and the time difference; and the controller may be further configured to estimate the coupling coefficient or the mutual inductance by looking up the time difference in the LUT, and reading out a coupling coefficient or a mutual inductance corresponding to the time difference from the LUT.

In another general aspect, a wireless power receiver includes a target resonator configured to receive wireless power by resonating with a source resonator; and a controller configured to match an impedance of the target resonator based on an envelope of the wireless power received by the target resonator.

The wireless power receiver may further include a load configured to receive power from the target resonator; and a switch configured to interrupt the power from being received by the load; and the controller may be further configured to control the switch not to interrupt the power from being received by the load during a power transmission mode, control the switch to interrupt the power from being received by the load during an impedance matching mode, and match the impedance of the target resonator during the impedance matching mode.

The controller may be further configured to estimate a coupling coefficient or a mutual inductance between the source resonator and the target resonator based on a time difference between two points of the envelope, and match the impedance of the target resonator based on the estimated coupling coefficient or mutual inductance.

The time difference may change as a distance between the source resonator and the target resonator changes.

The wireless transmitter may further include a lookup table (LUT) storing a relationship between the coupling coefficient or the mutual inductance and the time difference; and the controller may be further configured to estimate the coupling coefficient or the mutual inductance by looking up the time difference in the LUT, and reading out a coupling coefficient or a mutual inductance corresponding to the time difference from the LUT.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
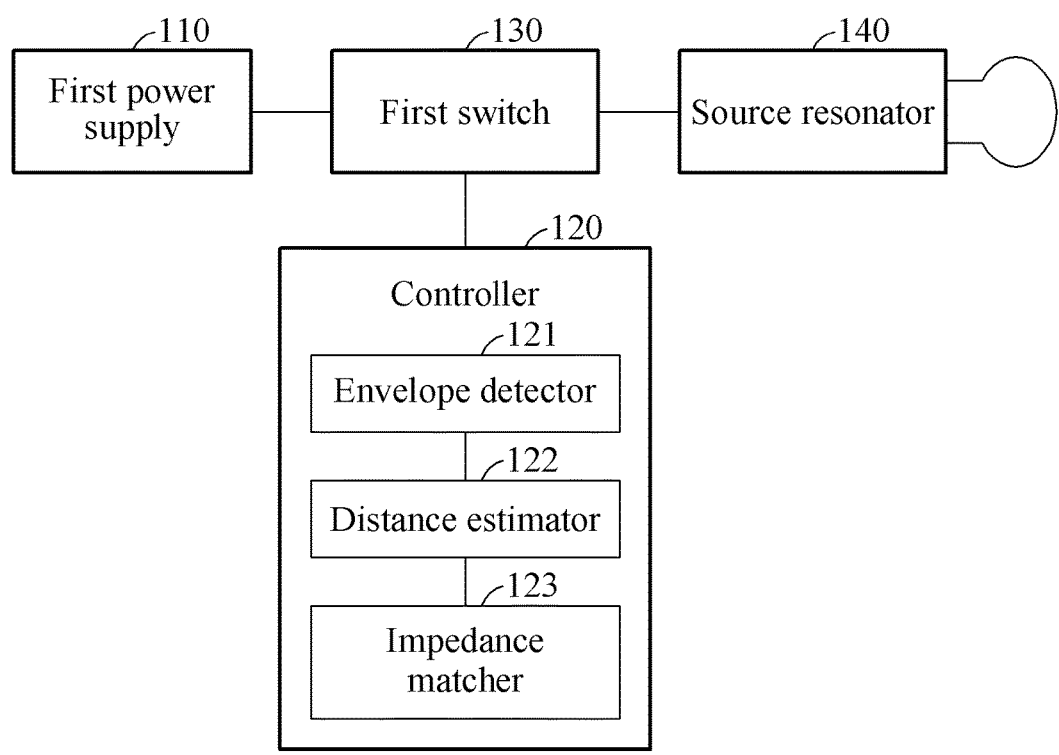
FIG. 1 is a block diagram illustrating an example of a wireless power transmitter.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A wireless power transmission system is used in various systems requiring wireless power. The wireless power transmission system is used for a system in which use of wireless power is possible, such as, a mobile device or a wireless television (TV). Also, the wireless power transmission system is applicable to a bio healthcare field, for example, to remote transmission of power to a device inserted into a human body, or wireless transmission of power to a bandage-shaped device for measuring a heart rate.

The wireless power transmission system operates in a relatively low power state, and is used to supply power to a device having a relatively lower power consumption, for example, a low power sensor.

Moreover, the wireless power transmission system is used for remote control of an information storing apparatus that does not have a power source. The wireless power transmission system is employed in a system that wirelessly imports information stored in the information storing apparatus, and at the same time remotely supplies power used for operating the information storing apparatus to the information storing apparatus.

The wireless power transmission system receives energy from a power supply device to generate a signal to store the signal in a source resonator, turns OFF a switch that electrically connects the power supply device to the source resonator, and induces self-resonance in the source resonator. When a target resonator having a resonance frequency equal to a resonance frequency of the source resonator is located at a distance sufficiently close to mutually resonate with the self-resonant source resonator, mutual resonance occurs between the source resonator and the target resonator. The source resonator is a resonator receiving energy from the power supply device, and the target resonator is a resonator receiving energy from the source resonator due to the mutual resonance.

As used herein, the wireless power transmission system is referred to as a resonator isolation (RI) system.

FIG. 1 is a block diagram illustrating an example of a wireless power transmitter. FIG. 1 illustrates the wireless power transmitter when a second power supply and a second switch that are described later are omitted.

The wireless power transmitter operates in a power transmission mode and an impedance matching mode. As used herein, the power transmission mode is an operation mode for transmitting power to a load of a wireless power receiver from the wireless power transmitter, and the impedance matching mode is an operation mode for matching an impedance of a source resonator.

The wireless power transmitter determines whether to operate in the impedance matching mode based on predetermined intervals or a predetermined power transmission efficiency. In one example, the wireless power transmitter operates in the impedance matching mode at predetermined intervals, for example, at intervals of 30 minutes. In another example, when a power transmission efficiency is less than the predetermined power transmission efficiency, the wireless power transmitter operates in the impedance matching mode. In the impedance matching mode, the wireless power transmitter matches an impedance of the source resonator, ends the impedance matching mode, and operates in the power transmission mode. Also, in the impedance matching mode, when mutual resonance between the source resonator and a target resonator is suspended, the wireless power transmitter ends the impedance matching mode, and operates in the power transmission mode.

Referring to FIG. 1, the wireless power transmitter includes a first power supply 110, a controller 120, a first switch 130, and a source resonator 140.

The first power supply 110 supplies power to the source resonator 140. The first power supply 110 is a direct current (DC) voltage source or a DC current source. The first power supply 110 supplies power to the source resonator 140 when the first power supply 110 is connected to the source resonator 140 via the first switch 130. The first power supply 110 includes an input source and an input resistance.

The first switch 130 connects the first power supply 110 to the source resonator 140. The first switch 130 turns ON/OFF the connection between the first power supply 110 and the source resonator 140 based under control of the controller 120. When the connection is turned ON, the first power supply 110 is connected to the source resonator 140, and when the connection is turned OFF, the first power supply 110 is disconnected from the source resonator 140.

The source resonator 140 transmits power to the wireless power receiver via mutual resonance with the target resonator.

The controller 120 estimates a distance between the source resonator 140 and the target resonator, and matches an impedance of the source resonator 140 based on the estimated distance. The controller 120 includes an envelope detector 121, a distance estimator 122, and an impedance matcher 123.

In the impedance matching mode, the controller 120 supplies power to the source resonator 140 by controlling the first switch 130 to perform impedance matching of the source resonator 140. For example, the controller 120 turns ON/OFF the first switch 130 at predetermined intervals. When the first switch 130 is turned ON, the first switch 130 is connected to the first power supply 110, and power is input to the source resonator 140. When the first switch 130 is turned OFF, the first switch 130 is disconnected from the first power supply 110, and the source resonator 140 is isolated. The isolated source resonator 140 performs mutual resonance with the target resonator, and the controller 120 performs the impedance matching of the source resonator 140 when the source resonator 140 performs the mutual resonance with the target resonator in the impedance matching mode. A resonance frequency between the source resonator 140 and the target resonator in the impedance matching mode is equal to a resonance frequency between the source resonator 140 and the target resonator in the power transmission mode. Accordingly, the controller 120 performs the impedance matching of the source resonator 140 using the resonance frequency between the source resonator 140 and the target resonator, rather than using an additional communication frequency.

The envelope detector 121 detects an envelope of power transmitted by the source resonator 140 in the impedance matching mode. The envelope detector 121 detects an envelope by sampling a waveform of the power transmitted by the source resonator 140. For example, the envelope detector 121 detects an envelope of a change in a voltage when the target resonator performs the mutual resonance with the source resonator 140.

The distance estimator 122 estimates a distance between the source resonator 140 and the target resonator based on the envelope. During the mutual resonance between the source resonator 140 and the target resonator, the shorter the distance between the source resonator 140 and the target resonator, the greater a magnitude of the power exchanged between the source resonator 140 and the target resonator, and the shorter the intervals of the power exchanged between the source resonator 140 and the target resonator. Additionally, the shorter the distance between the source resonator 140 and the target resonator, the greater the values of a coupling coefficient and mutual inductance between the source resonator 140 and the target resonator. Accordingly, the distance estimator 122 simultaneously analyzes the magnitude and the intervals of power induced in the source resonator 140 and the target resonator, and estimates the coupling coefficient or the mutual inductance between the source resonator 140 and the target resonator based on the magnitude and the intervals.

In one example, the distance estimator 122 estimates the coupling coefficient or the mutual inductance between the source resonator 140 and the target resonator based on a time difference between at least two points of the envelope. The at least two points of the envelope include at least two of at least one peak point at which an amplitude of the envelope reaches a peak, at least one minimum point at which the amplitude of the envelope reaches a minimum, and a start point at which the source resonator 140 and the target resonator start the mutual resonance in the impedance matching mode.

When the source resonator 140 and the target resonator perform the mutual resonance, the envelope may be in a form of a sine wave in every resonance interval. Consequently, during a resonance interval, the envelope includes a single peak point and a single minimum point.

The distance estimator 122 obtains the time difference between the at least two points of the envelope by analyzing the envelope. Also, the distance estimator 122 estimates the coupling coefficient or the mutual inductance between the source resonator 140 and the target resonator based on the time difference between the at least two points of the envelope.

In one example, the distance estimator 122 estimates the coupling coefficient or the mutual inductance between the source resonator 140 and the target resonator based on a time difference between the at least one peak point, a time difference between the at least one minimum point, a time difference between the at least one peak point and the at least one minimum point, a time difference between the start point and the at least one peak point, or a time difference between the start point and the at least one minimum point.

When the source resonator 140 and the target resonator remain at a predetermined distance from each other, the time difference between the at least one peak point and the time difference between the at least one minimum point remain constant. For example, a time difference between a first peak point and a second peak point and a time difference between the second peak point and a third peak point remain constant. Accordingly, the time difference between the at least one peak point and the at least one minimum point also remains constant. Consequently, when the time difference between the first peak point and the second peak point is obtained, a time difference between subsequent peak points may be obtained, and when the time difference between a first minimum point and a second minimum point is obtained, a time difference between subsequent minimum points may be obtained. Thus, when a time difference between the first peak point and the first minimum point is obtained, a time difference between the subsequent peak points and the subsequent minimum points may be obtained.

When the source resonator 140 and the target resonator perform the mutual resonance, and conditions of the mutual resonance, for example, a size and a material of an antenna of the source resonator 140 and the target resonator, remain constant, the coupling coefficient and the mutual inductance between the source resonator 140 and the target resonator may change depending on the distance between the source resonator 140 and the target resonator. Also, the time difference between the at least two points of the envelope may changes depending on the distance between the source resonator 140 and the target resonator because the amplitude and the intervals of the envelope change depending on the distance between the source resonator 140 and the target resonator. Accordingly, the coupling coefficient or the mutual inductance between the source resonator 140 and the target resonator is a function of the time difference between the at least two points of the envelope, and the distance estimator 122 includes information about a relationship between the coupling coefficient or the mutual inductance between the source resonator 140 and the target resonator, and the time difference between the at least two points of the envelope. In one example, the distance estimator 122 includes a lookup table (LUT) storing the information about the relationship between the coupling coefficient or the mutual inductance between the source resonator 140 and the target resonator, and the time difference between the at least two points of the envelope. The distance estimator 122 extracts the time difference between the at least two points of the envelope, and estimates the coupling coefficient or the mutual inductance between the source resonator 130 and the target resonator by looking up the time difference in the LUT and reading out a corresponding coupling coefficient or mutual inductance from the LUT. When the coupling coefficient or the mutual inductance between the source resonator 140 and the target resonator is estimated, the distance estimator 122 estimates the distance between the source resonator 140 and the target resonator because the coupling coefficient or the mutual inductance between the source resonator 140 and the target resonator is a function of the distance between the source resonator 140 and the target resonator.

The impedance matcher 123 matches the impedance of the source resonator 140 based on the estimated distance. In one example, the impedance matcher 123 includes an impedance matching network (IMN). In another example, the impedance matcher 123 obtains an equivalent circuit of the wireless power transmitter and the wireless power receiver based on the estimated coupling coefficient or mutual inductance. The impedance matcher 123 extracts the impedance of the source resonator 140 from the equivalent circuit, and performs impedance matching based on the extracted impedance.

Figure 2:
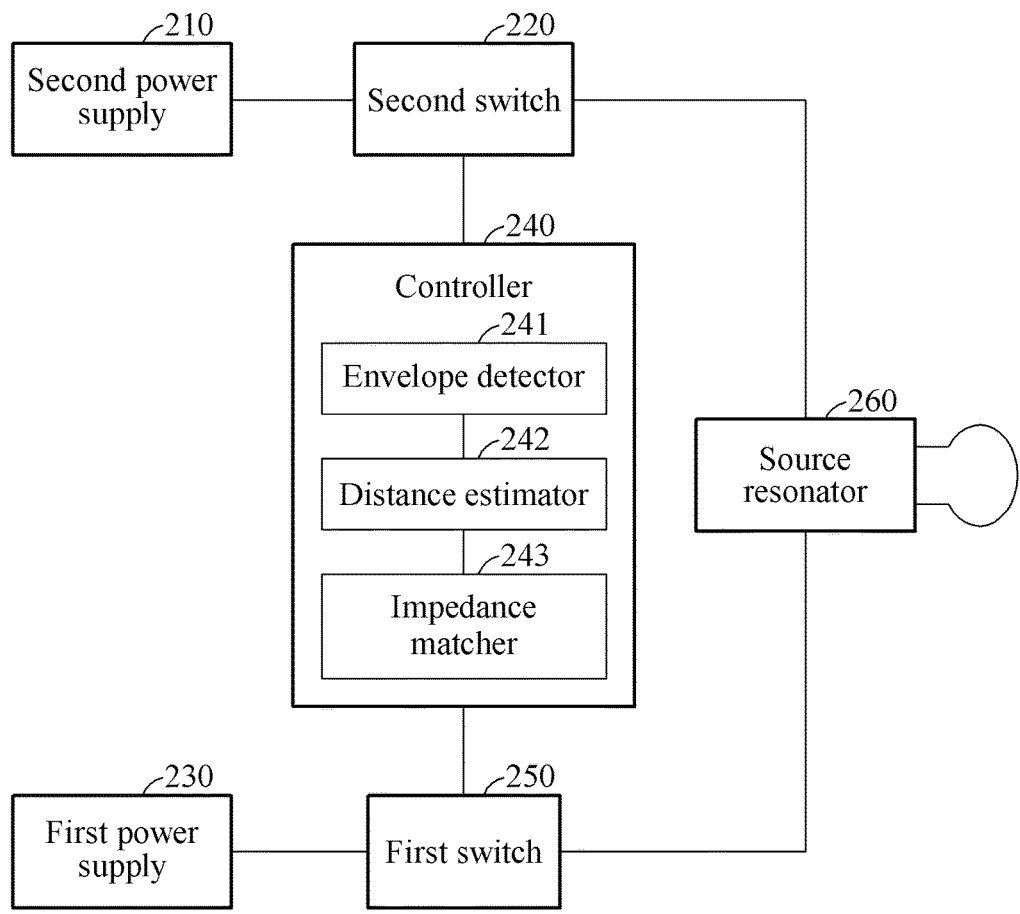
FIG. 2 is a block diagram illustrating another example of a wireless power transmitter.

FIG. 2 is a block diagram illustrating another example of a wireless power transmitter. FIG. 2 illustrates the wireless power transmitter as including a second power supply and a second switch that are omitted in the wireless power transmitter illustrated in FIG. 1.

Referring to FIG. 2, the wireless power transmitter includes a first power supply 230, a first switch 250, a second power supply 210, a second switch 220, a controller 240, and a source resonator 260.

The first power supply 230 supplies power to the source resonator 260 in a power transmission mode.

The second power supply 210 supplies power to the source resonator 260 in an impedance matching mode. The second power supply 210 is a DC voltage source or a DC current source. The second power supply 210 supplies a relatively lower amount of power than the first power supply 230. In the impedance matching mode, the second power supply 210 supplies power to the source resonator 260 when the second power supply 210 is connected to the source resonator 260 via the second switch 220. The second power supply 210 includes an input source and an input resistance.

The second switch 220 connects the second power supply 210 to the source resonator 260. The second switch 220 turns ON/OFF the connection between the second power supply 210 and the source resonator 260 under control of the controller 240. When the connection is turned ON, the second power supply 210 is connected to the source resonator 260, and when the connection is turned OFF, the second power supply 210 is disconnected from the source resonator 260.

The source resonator 260 receives a power supply from the first power supply 230 in the power transmission mode, and receives a power supply from the second power supply 210 in the impedance matching mode. The source resonator 260 transmits the power supply received from the first power supply 230 or the second power supply 210 to a wireless power receiver.

The controller 240 estimates a distance between the source resonator 260 and a target resonator, and matches an impedance of the source resonator 260 based on the estimated distance. The controller 240 includes an envelope detector 241, a distance estimator 242, and an impedance matcher 243.

In the impedance matching mode, the controller 240 supplies power to the source resonator 260 by controlling the second switch 220 to perform impedance matching of the source resonator 260. For example, the controller 240 turns OFF the first switch 250, and turns ON/OFF the second switch 220 at predetermined intervals. When the second switch 220 is turned ON, the second switch 220 is connected to the second power supply 210, and power is input to the source resonator 260. When the second switch 220 is turned OFF, the second switch 220 is disconnected from the second power supply 210, and the source resonator 260 is isolated. The isolated source resonator 260 performs mutual resonance with the target resonator, and the controller 240 performs the impedance matching of the source resonator 260 when the source resonator 260 performs the mutual resonance with the target resonator in the impedance matching mode.

The envelope detector 241 detects an envelope of power transmitted by the source resonator 260, the distance estimator 242 estimates a distance between the source resonator 260 and the target resonator based on the envelope, and the impedance matcher 243 matches the impedance of the source resonator 260 based on the estimated distance between the source resonator 260 and the target resonator. The descriptions of the envelope detector 121, the distance estimator 122, and the impedance matcher 123 illustrated in FIG. 1 are also applicable to the envelope detector 241, the distance estimator 242, and the impedance matcher 243 illustrated in FIG. 2, and thus the descriptions will not be repeated for conciseness.

Figure 3:
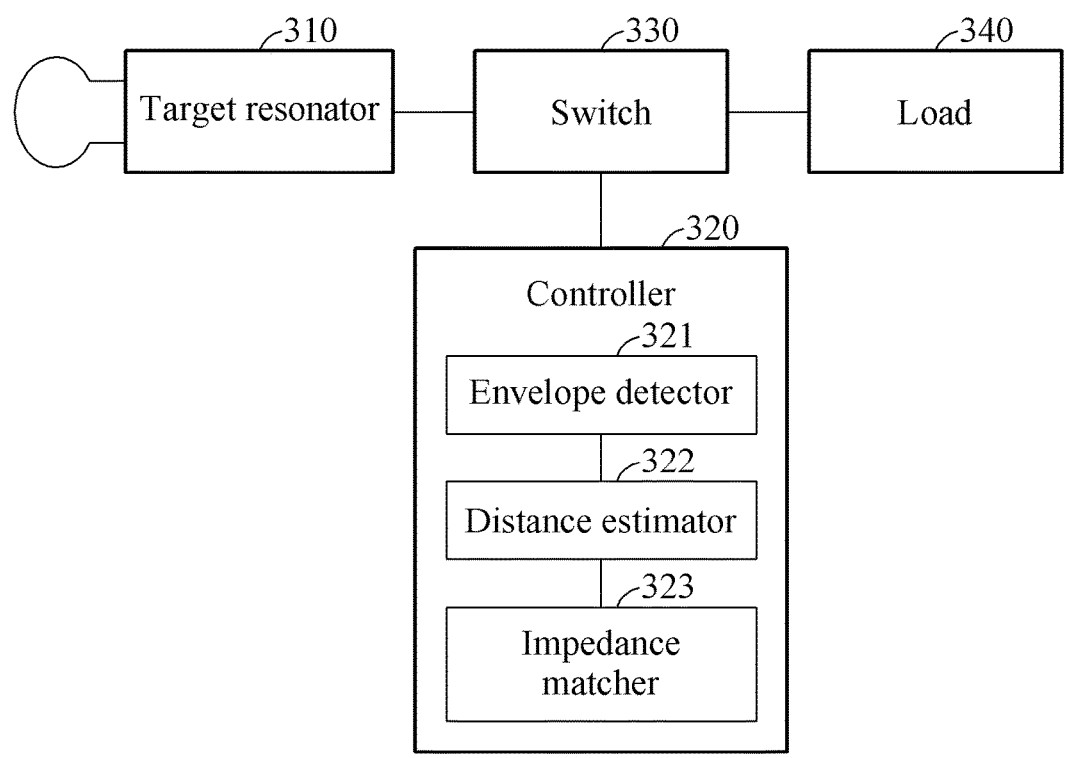
FIG. 3 is a block diagram illustrating an example of a wireless power receiver.

FIG. 3 is a block diagram illustrating an example of a wireless power receiver.

The wireless power receiver operates in a power transmission mode and an impedance matching mode. As used herein, the power transmission mode of the wireless power receiver is an operation mode for supplying power received from a wireless power transmitter to a load, and the impedance matching mode is an operation mode for matching an impedance of a target resonator.

The wireless power receiver determines an operation mode of the wireless power receiver based on the operation mode of the wireless power transmitter. For one example, when the wireless power transmitter changes the operation mode from the power transmission mode to the impedance matching mode, the wireless power receiver detects the change of the operation mode of the wireless power transmitter, and sets the operation mode of the wireless power receiver to the impedance matching mode. In one example, a magnitude and intervals of power transmitted by the wireless power transmitter change depending on the operation mode. The wireless power receiver sets the operation mode of the wireless power receiver based on the change in the power received by the target resonator from the source resonator.

Referring to FIG. 3, the wireless power receiver includes a target resonator 310, a controller 320, a switch 330, and a load 340.

The target resonator 310 receives wireless power through mutual resonance with the source resonator.

The switch 330 connects the load 340 to the target resonator 310. The switch 330 turns ON/OFF the connection between the load 340 and the target resonator 310 under control of the controller 320. When the connection is turned ON, the load 340 is connected to the target resonator 310, and when the connection is turned OFF, the load 340 is disconnected from the target resonator 310.

The load 340 includes a load and a capacitor. In the power transmission mode, the load 340 is supplied with power received from the target resonator 310.

The controller 320 estimates a distance between the source resonator and the target resonator 310, and matches an impedance of the target resonator 310. The controller 320 includes an envelope detector 321, a distance estimator 322, and an impedance matcher 323.

When the operation mode of the wireless power transmitter is the impedance matching mode, a magnitude and intervals of power received by the target resonator 310 are different from a magnitude and intervals of power received by the target resonator 310 when the wireless power transmitter is in the power transmission mode. The controller 320 sets the operation mode of the wireless power receiver based on the change in the power received by the target resonator 310.

When the controller 320 sets the operation mode to the impedance matching mode, the controller 320 turns OFF the switch 330 to disconnect the connection between the load 340 and the target resonator 310 to enhance the accuracy of the impedance matching. However, in another example, the controller 320 performs the impedance matching while maintaining the switch 330 to be ON.

A resonance frequency between the source resonator and the target resonator 310 in the impedance matching mode is equal to a resonance frequency between the source resonator and the target resonator 310 in the power transmission mode. Accordingly, the controller 320 performs the impedance matching of the target resonator 310 using the resonance frequency between the source resonator and the target resonator 310, rather than an additional communication frequency.

The envelope detector 321 detects an envelope of power received by the target resonator 310 in the impedance matching mode. The envelope detector 321 detects an envelope by sampling a waveform of the power received by the target resonator 310. For example, the envelope detector 321 detects an envelope of a change in a voltage when the source resonator performs the mutual resonance with the target resonator 310.

The distance estimator 322 estimates a distance between the source resonator and the target resonator 310 based on the envelope. During the mutual resonance between the source resonator and the target resonator 310, the shorter the distance between the source resonator and the target resonator 310, the greater a magnitude of the power exchanged between the source resonator and the target resonator 310, and the shorter the intervals of the power exchanged between the source resonator and the target resonator 310. Additionally, the shorter the distance between the source resonator and the target resonator 310, the greater the values of a coupling coefficient and mutual inductance between the source resonator and the target resonator 310. Accordingly, the distance estimator 322 simultaneously analyzes the magnitude and the intervals of the power induced in the source resonator and the target resonator 310, and estimates the coupling coefficient or the mutual inductance between the source resonator and the target resonator 310 based on the magnitude and intervals.

In one example, the distance estimator 322 estimates the coupling coefficient or the mutual inductance between the source resonator and the target resonator 310 based on a time difference between at least two points of an envelope. The at least two points of the envelope include at least two of at least one peak point at which an amplitude of the envelope reaches a peak, at least one minimum point at which the amplitude of the envelope reaches a minimum, and a start point at which the source resonator and the target resonator 310 start the mutual resonance in the impedance matching mode.

When the source resonator and the target resonator 310 perform the mutual resonance, the envelope may be in a form of a sine wave in every resonance interval. Consequently, during a resonance interval, the envelope includes a single peak point and a single minimum point.

The distance estimator 322 obtains the time difference between the at least two points of the envelope by analyzing the envelope. Also, the distance estimator 322 estimates the coupling coefficient or the mutual inductance between the source resonator and the target resonator 310 based on the time difference between the at least two points of the envelope.

When the source resonator and the target resonator 310 perform the mutual resonance, and conditions of the mutual resonance, for example, a size and a material of an antenna of the source resonator and the target resonator 310, remain constant, the coupling coefficient and the mutual inductance between the source resonator and the target resonator 310 change depending on the distance between the source resonator and the target resonator 310. Also, the time difference between the at least two points of the envelope changes depending on the distance between the source resonator and the target resonator 310 because the amplitude and the intervals of the envelope change depending on the distance between the source resonator and the target resonator 310. Accordingly, the coupling coefficient or the mutual inductance between the source resonator and the target resonator 310 is a function of the time difference between the at least two points of the envelope, and the distance estimator 322 includes information about a between the coupling coefficient or the mutual inductance between the source resonator and the target resonator 310, and the time difference between the at least two points of the envelope. In one example, the distance estimator 322 includes an LUT storing the information about the relationship between the coupling coefficient or the mutual inductance between the source resonator and the target resonator 310, and the time difference between the at least two points of the envelope. The distance estimator 322 extracts the time difference between the at least two points of the envelope, and estimates the coupling coefficient or the mutual inductance between the source resonator and the target resonator 310 by looking up the time difference in the LUT and reading out a corresponding coupling coefficient or mutual inductance from the LUT. When the coupling coefficient or the mutual inductance between the source resonator and the target resonator 310 is estimated, the distance estimator 322 estimates the distance between the source resonator and the target resonator 310 because the coupling coefficient or the mutual inductance between the source resonator and the target resonator 310 is a function of the distance between the source resonator and the target resonator 310.

The impedance matcher 323 matches the impedance of the target resonator 310 based on the estimated distance. In one example, the impedance matcher 323 includes an IMN. In another example, the impedance matcher 323 obtains an equivalent circuit of the wireless power transmitter and the wireless power receiver based on the estimated coupling coefficient or mutual inductance. The impedance matcher 323 extracts the impedance of the target resonator 310 from the equivalent circuit, and performs impedance matching based on the extracted impedance.

Figure 4A:
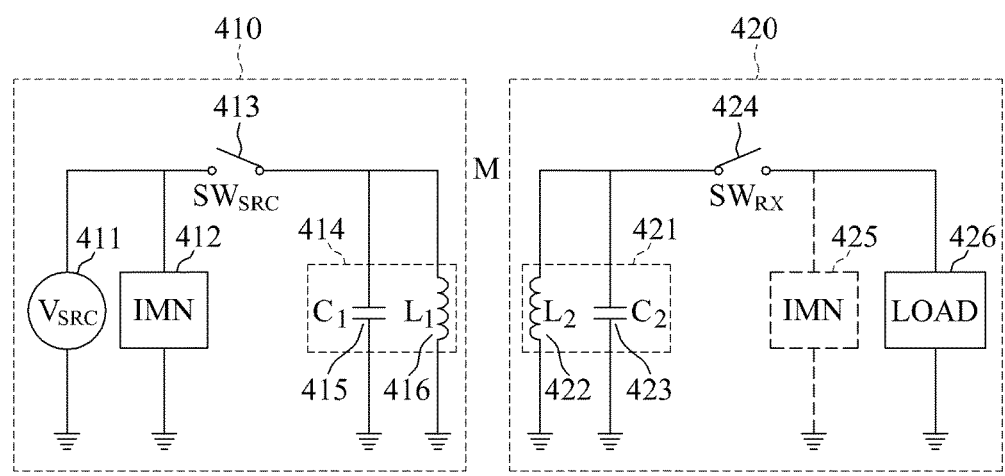
FIGS. 4A and 4B are diagrams illustrating examples of a wireless power transmitter and a wireless power receiver.
Figure 4B:
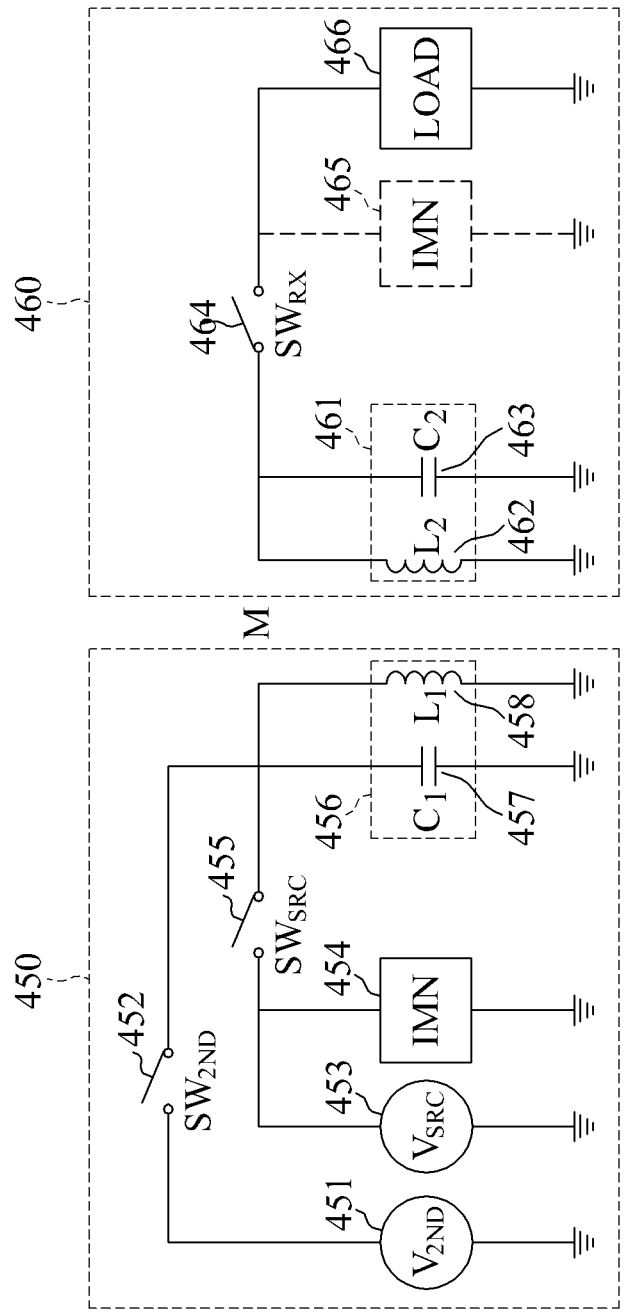

FIGS. 4A and 4B are diagrams illustrating examples of a wireless power transmitter and a wireless power receiver.

Referring to FIG. 4A, a wireless power transmitter 410 includes a first power supply 411, an IMN 412, a first switch 413, a controller (not shown), and a source resonator 414. The source resonator 414 includes a capacitor C1 415 and an inductor L1 416.

The first power supply 411 supplies power to the source resonator 414. The first power supply 411 supplies power to the source resonator 414 when the first power supply 411 is connected to the source resonator 414 via the first switch 413.

The first switch 413 connects the first power supply 411 to the source resonator 414. The first switch 413 turns ON/OFF the connection between the first power supply 411 and the source resonator 414 under control of the controller (not shown). When the connection is turned ON, the first power supply 411 is connected to the source resonator 414, and when the connection is turned OFF, the first power supply 411 is disconnected from the source resonator 414.

The source resonator 414 transmits power to a wireless power receiver via mutual resonance with a target resonator 421.

The controller (not shown) estimates a distance between the source resonator 414 and the target resonator 421, and matches an impedance of the source resonator 414 based on the estimated distance. The controller (not shown) includes the IMN 412.

In an impedance matching mode, the controller (not shown) supplies power to the source resonator 414 by controlling the first switch 413 to perform impedance matching of the source resonator 414. When the first switch 413 is turned ON, the first switch 413 is connected to the first power supply 411, and power is input to the source resonator 414. When the first switch 413 is turned OFF, the first switch 413 is disconnected from the first power supply 411, and the source resonator 414 is isolated. The isolated source resonator 414 performs mutual resonance with the target resonator 421, and the IMN 412 performs the impedance matching of the source resonator 414 when the source resonator 414 performs the mutual resonance with the target resonator 421 in the impedance matching mode.

The controller (not shown) detects an envelope of power transmitted by the source resonator 414 in the impedance matching mode. The controller (not shown) detects an envelope by sampling a waveform of the power transmitted by the source resonator 414.

The controller (not shown) estimates a distance between the source resonator 414 and the target resonator 421 based on the envelope. In one example, the controller (not shown) estimates a coupling coefficient or mutual inductance between the source resonator 414 and the target resonator 421 based on a time difference between at least two points of the envelope. For example, the at least two points of the envelope include at least two of at least one peak point at which an amplitude of the envelope reaches a peak, at least one minimum point at which the amplitude of the envelope reaches a minimum, and a start point at which the source resonator 414 and the target resonator 421 start the mutual resonance in the impedance matching mode. The controller (not shown) obtains the time difference between the at least two points of the envelope by analyzing the envelope. Also, the controller (not shown) estimates the coupling coefficient or the mutual inductance between the source resonator 414 and the target resonator 421 based on the time difference between the at least two points of the envelope.

In one example, the controller (not shown) estimates the coupling coefficient or the mutual inductance between the source resonator 414 and the target resonator 421 based on a time difference between the at least one peak point, a time difference between the at least one minimum point, a time difference between the at least one peak point and the at least one minimum point, a time difference between the start point and the at least one peak point, or a time difference between the start point and the at least one minimum point.

When the source resonator 414 and the target resonator 421 remain at a predetermined distance from each other, the time difference between the at least one peak point and the time difference between the at least one minimum point remain constant. Accordingly, when a time difference between a first peak point and a second peak point is obtained, a time difference between subsequent peak points may be obtained, and when a time difference between a first minimum point and a second minimum point is obtained, a time difference between subsequent minimum points may be obtained. Thus, when a time difference between the first peak point and the first minimum point is obtained, the time difference between the subsequent peak points and the subsequent minimum points may be obtained.

When the source resonator 414 and the target resonator 421 perform the mutual resonance, and conditions of the mutual resonance remain constant, the coupling coefficient and the mutual inductance between the source resonator 414 and the target resonator 421 changes depending on the distance between the source resonator 414 and the target resonator 421. Also, the time difference between the at least two points of the envelope changes depending on the distance between the source resonator 414 and the target resonator 421 because an amplitude and intervals of the envelope change depending on the distance between the source resonator 414 and the target resonator 421. Accordingly, the coupling coefficient or the mutual inductance between the source resonator 414 and the target resonator 421 is a function of the time difference between the at least two points of the envelope, and the controller (not shown) includes information about a relationship between the coupling coefficient or the mutual inductance between the source resonator 414 and the target resonator 421, and the time difference between the at least two points of the envelope. When the coupling coefficient or the mutual inductance between the source resonator 414 and the target resonator 421 is estimated, the controller (not shown) estimates the distance between the source resonator 414 and the target resonator 421 because the coupling coefficient or the mutual inductance between the source resonator 414 and the target resonator 421 is a function of the distance between the source resonator 414 and the target resonator 421.

The IMN 412 matches the impedance of the source resonator 414 based on the estimated distance. In one example, the IMN 412 obtains an equivalent circuit of the wireless power transmitter and the wireless power receiver based on the estimated coupling coefficient or mutual inductance. The IMN 412 extracts the impedance of the source resonator 414 from the equivalent circuit, and performs impedance matching based on the extracted impedance.

A wireless power receiver 420 includes the target resonator 421, a switch 424, an IMN 425, a controller (not shown), and a load 426. The target resonator 421 includes an inductor L2 422 and a capacitor C2 423.

In another example, the wireless power receiver 420 receives wireless power from the wireless power transmitter 410 without performing impedance matching by omitting the IMN 425.

The target resonator 421 receives wireless power through mutual resonance with the source resonator 414.

The switch 424 connects the load 426 to the target resonator 421. The switch 424 turns ON/OFF the connection between the load 426 and the target resonator 421 under control of the controller (not shown). When the connection is turned ON, the load 426 is connected to the target resonator 421, and when the connection is turned OFF, the load 426 is disconnected from the target resonator 421.

The load 426 includes a load and a capacitor. In the power transmission mode, the load 426 is supplied with power received from the target resonator 421.

The controller (not shown) estimates a distance between the source resonator 414 and the target resonator 421, and matches the impedance of the target resonator 421 based on the estimated distance. The controller (not shown) includes the IMN 425.

When the controller (not shown) sets the operation mode to the impedance matching mode, the controller (not shown) turns OFF the switch 424 to disconnect the connection between the load 426 and the target resonator 421 to enhance the accuracy of the impedance matching. However, in another example, the controller (not shown) performs the impedance matching while maintaining the switch 424 to be ON.

A resonance frequency between the source resonator 414 and the target resonator 421 in the impedance matching mode is equal to a resonance frequency between the source resonator 414 and the target resonator 421 in the power transmission mode. Accordingly, the controller (not shown) performs the impedance matching of the target resonator 421 using the resonance frequency between the source resonator 414 and the target resonator 421, rather than an additional communication frequency.

The controller (not shown) detects an envelope by sampling a waveform of the power received by the target resonator 421 in the impedance matching mode.

The controller (not shown) estimates the distance between the source resonator 414 and the target resonator 421 based on the envelope. During the mutual resonance between the source resonator 414 and the target resonator 421, the shorter the distance between the source resonator 414 and the target resonator 421, the greater a magnitude of the power exchanged between the source resonator 414 and the target resonator 421, and the shorter the intervals of the power exchanged between the source resonator 414 and the target resonator 421. Additionally, the shorter the distance between the source resonator 414 and the target resonator 421, the greater the values of the coupling coefficient and the mutual inductance between the source resonator 414 and the target resonator 421. Accordingly, the controller (not shown) simultaneously analyzes the magnitude and the intervals of the power induced in the source resonator 414 and the target resonator 421, and estimates the coupling coefficient or the mutual inductance between the source resonator 414 and the target resonator 421 based on the magnitude and the intervals.

In one example, the controller (not shown) estimates the coupling coefficient or the mutual inductance between the source resonator 414 and the target resonator 421 based on a time difference between at least two points of the envelope. The at least two points of the envelope include at least two of at least one peak point at which an amplitude of the envelope reaches a peak, at least one minimum point at which the amplitude of the envelope reaches a minimum, and a start point at which the source resonator 414 and the target resonator 421 start the mutual resonance in the impedance matching mode.

The controller (not shown) obtains the time difference between the at least two points of the envelope by analyzing the envelope. Also, the controller (not shown) estimates the coupling coefficient or the mutual inductance between the source resonator 414 and the target resonator 421 based on the time difference between the at least two points of the envelope.

When the coupling coefficient or the mutual inductance between the source resonator 414 and the target resonator 421 is estimated, the controller (not shown) estimates the distance between the source resonator 414 and the target resonator 421 because the coupling coefficient or the mutual inductance between the source resonator 414 and the target resonator 421 is a function of the distance between the source resonator 414 and the target resonator 421.

The IMN 425 matches the impedance of the target resonator 421 based on the estimated distance. In one example, the IMN 425 obtains an equivalent circuit of the wireless power transmitter 410 and the wireless power receiver 420 based on the estimated coupling coefficient or mutual inductance. The IMN 425 extracts the impedance of the target resonator 421 from the equivalent circuit, and performs impedance matching based on the extracted impedance.

Referring to FIG. 4B, a wireless power transmitter 450 includes a first power supply 453, a first switch 455, a second power supply 451, a second switch 452, an IMN 454, a controller (not shown), and a source resonator 456. The source resonator 456 includes a capacitor C1 457 and an inductor 458.

The first power supply 453 supplies power to the source resonator 456 in the power transmission mode.

The second power supply 451 supplies power to the source resonator 456 in the impedance matching mode. The second power supply 451 supplies a relatively lower amount of power than the first power supply 453. In the impedance matching mode, when the second power supply 451 is connected to the source resonator 456 via the second switch 452, the second power supply 451 supplies power to the source resonator 456.

The second switch 452 connects the second power supply 451 to the source resonator 456. The second switch 452 turns ON/OFF the connection between the second power supply 451 and the source resonator 456 under control of the controller (not shown). When the connection is turned ON, the second power supply 451 is connected to the source resonator 456, and when the connection is turned OFF, the second power supply 451 is disconnected from the source resonator 456.

The source resonator 456 receives power from the first power supply 453 in the power transmission mode, and receives power from the second power supply 451 in the impedance matching mode. The source resonator 456 transmits the power received from the first power supply 453 or the second power supply 451 to a wireless power receiver 460 through mutual resonance with a target resonator 461.

The controller (not shown) estimates a distance between the source resonator 456 and the target resonator 461, and matches an impedance of the source resonator 456 based on the estimated distance. The controller (not shown) includes the IMN 454.

In the impedance matching mode, the controller (not shown) supplies power to the source resonator 456 by controlling the second switch 452. When the second switch 452 is turned ON, the second switch 452 is connected to the second power supply 451, and power is supplied to the source resonator 456. When the second switch 452 is turned OFF, the second switch 452 is disconnected from the second power supply 451, and the source resonator 456 is isolated. The isolated source resonator 456 performs mutual resonance with the target resonator 461, and the IMN 454 performs the impedance matching of the source resonator 456 when the source resonator 456 performs the mutual resonance with the target resonator 461 in the impedance matching mode.

The controller (not shown) detects an envelope of power transmitted by the source resonator 456, and estimates the distance between the source resonator 456 and the target resonator 461 based on the envelope. The IMN 454 matches the impedance of the source resonator 456 based on the estimated distance between the source resonator 456 and the target resonator 461.

The wireless power receiver 460 includes the target resonator 461, a switch 464, an IMN 465, a controller (not shown), and a load 466. The target resonator 461 includes an inductor L2 462 and a capacitor C2 463.

In one example, the wireless power receiver 460 receives wireless power from the wireless power transmitter 450 without performing impedance matching by omitting the IMN 465.

The target resonator 461 receives wireless power through mutual resonance with the source resonator 456.

The switch 464 connects the load 466 to the target resonator 461. The switch 464 turns ON/OFF the connection between the load 466 and the target resonator 461 under control of the controller (not shown). When the connection is turned ON, the load 466 is connected to the target resonator 461, and when the connection is turned OFF, the load 466 is disconnected from the target resonator 461.

The load 466 includes a load and a capacitor. In the power transmission mode, the load 466 is supplied with power received from the target resonator 461.

The controller (not shown) estimates a distance between the source resonator 456 and the target resonator 461, and matches the impedance of the target resonator 461 based on the distance. The controller (not shown) includes the IMN 465.

When the controller (not shown) sets the operation mode to the impedance matching mode, the controller (not shown) turns OFF the switch 464 to disconnect the connection between the load 466 and the target resonator 461 to enhance the accuracy of the impedance matching. In one example, the controller (not shown) performs the impedance matching while maintaining the switch 464 to be ON.

The controller (not shown) detects an envelope by sampling a waveform of the power received by the target resonator 461 in the impedance matching mode.

The controller (not shown) estimates a distance between the source resonator 456 and the target resonator 461 based on the envelope. During the mutual resonance between the source resonator 456 and the target resonator 461, the shorter the distance between the source resonator 456 and the target resonator 461, the greater a magnitude of the power exchanged between the source resonator 456 and the target resonator 461, and the shorter the intervals of the power exchanged between the source resonator 456 and the target resonator 461. Additionally, the shorter the distance between the source resonator 456 and the target resonator 461, the greater the values of a coupling coefficient and mutual inductance between the source resonator 456 and the target resonator 461. Accordingly, the controller (not shown) simultaneously analyzes a magnitude and intervals of the power induced to the source resonator 456 and the target resonator 461, and estimates the coupling coefficient or the mutual inductance between the source resonator 456 and the target resonator 461 based on the magnitude and intervals.

In one example, the controller (not shown) estimates the coupling coefficient or the mutual inductance between the source resonator 456 and the target resonator 461 based on a time difference between at least two points of the envelope. The at least two points of the envelope include at least two of at least one peak point at which an amplitude of the envelope reaches a peak, at least one minimum point at which the amplitude of the envelope reaches a minimum, and a start point at which the source resonator 456 and the target resonator 461 start the mutual resonance in the impedance matching mode.

The controller (not shown) obtains the time difference between the at least two points of the envelope by analyzing the envelope. Also, the controller (not shown) estimates the coupling coefficient or the mutual inductance between the source resonator 456 and the target resonator 461 based on the time difference between the at least two points of the envelope.

When the coupling coefficient or the mutual inductance between the source resonator 456 and the target resonator 461 is estimated, the controller (not shown) estimates the distance between the source resonator 456 and the target resonator 461 because the coupling coefficient or the mutual inductance between the source resonator 456 and the target resonator 461 is a function of the distance between the source resonator 456 and the target resonator 461.

The IMN 465 matches the impedance of the target resonator 461 based on the estimated distance. In one example, the IMN 465 obtains an equivalent circuit of the wireless power transmitter 450 and the wireless power receiver 460 based on the estimated coupling coefficient or mutual inductance. The IMN 465 extracts the impedance of the target resonator 461 from the equivalent circuit, and performs impedance matching based on the extracted impedance.

Figure 5:
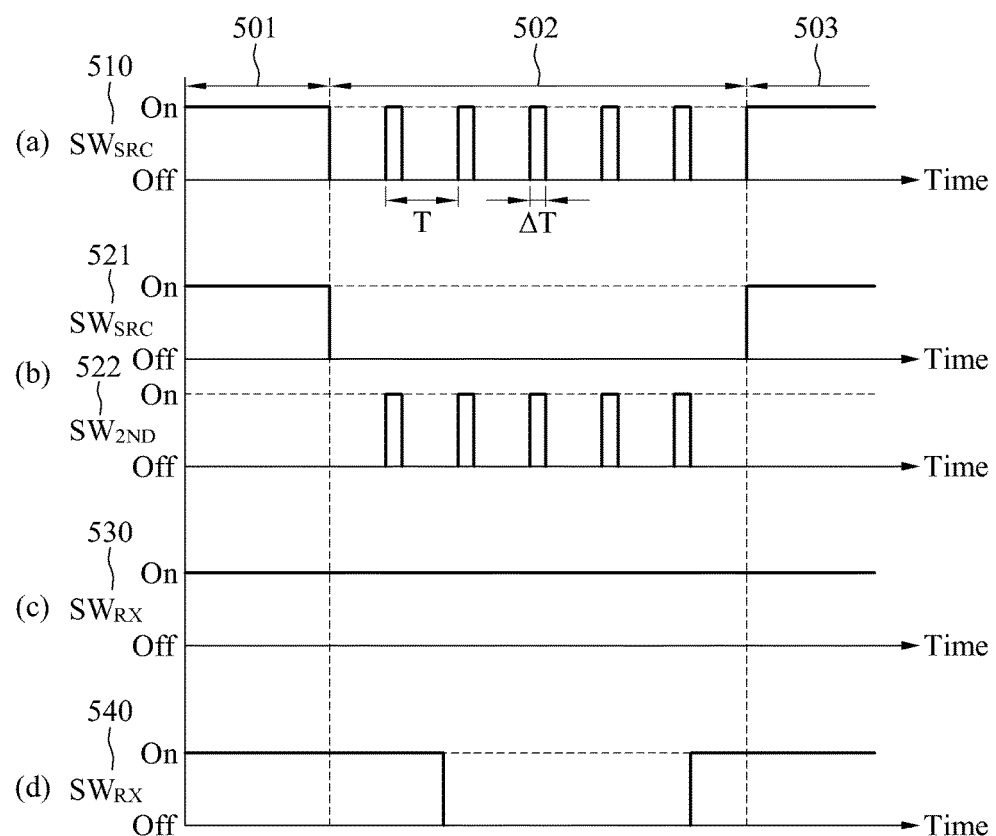
FIG. 5 illustrates examples of switching waveforms in a power transmission mode and an impedance matching mode.

FIG. 5 illustrates examples of switching waveforms in a power transmission mode and an impedance matching mode.

Referring to FIG. 5, a horizontal axis of the graph indicates time, and a vertical axis of the graph indicates an ON/OFF state of a switch. When an operation mode of a wireless power transmitter and a wireless power receiver is a power transmission mode, the wireless power transmitter transmits power to a load of the wireless power receiver in power transmission intervals 501 and 503. When the operation mode of the wireless power transmitter and the wireless power receiver is an impedance matching mode, the wireless power transmitter and the wireless power receiver perform impedance matching in an impedance matching interval 502.

A switching waveform (a) illustrates an operation of a first switch 510 ($SW_{SRC}$) in a wireless power transmitter that does not include a second power supply and a second switch.

In the power transmission intervals 501 and 503, a controller controls the first switch 510 to be in an ON state. In the impedance matching interval 502, the controller turns ON the first switch 510 during $\Delta T$, and turns OFF the first switch 510 during $T-\Delta T$ at switching intervals of a time T. Accordingly, at the intervals of T, power is input to a source resonator during $\Delta T$, and the source resonator is isolated during $T-\Delta T$. Mutual resonance between the source resonator and a target resonator occurs under control of the first switch 510 during the impedance matching interval 502, and the controller estimates a distance between the source resonator and the target resonator to match an impedance of the source resonator during the impedance matching interval 502.

A switching waveform (b) illustrates an operation of a first switch 521 ($SW_{SRC}$) and a second switch 522 ($SW_{2ND}$) in a wireless power transmitter including a second power supply and the second switch 522. During the power transmission intervals 501 and 503, a controller controls the first switch 521 to be in an ON state. During the impedance matching interval 502, the controller controls the first switch 521 to be in an OFF state. Also, during the power transmission intervals 501 and 503, the controller controls the second switch 522 to be in an OFF state, and during the impedance matching interval 502, the controller turns ON the second switch 522 during $\Delta T$, and turns OFF the second switch 522 during $T-\Delta T$ at the switching intervals of the time T. Accordingly, at the switching intervals of the time T, power is input to a source resonator during $\Delta T$, and the source resonator is isolated during $T-\Delta T$. For example, the power input to the source resonator under the control of the second switch 522 is relatively lower than the power input to the source resonator under the control of the first switch 521. Mutual resonance between the source resonator and a target resonator is performed under the control of the second switch 522 during the impedance matching interval 502, and the controller estimates the distance between the source resonator and the target resonator to match an impedance of the source resonator during the impedance matching interval 502.

Switching waveforms (c) and (d) illustrate an operation of a switch in a wireless power receiver. In the switching waveform (c), a controller of the wireless power receiver controls a switch 530 ($SW_{RX}$) to be in an ON state during the power transmission intervals 501 and 503 and in the impedance matching interval 502. During the impedance matching interval 502, a target resonator receives power from a source resonator during $\Delta T$ at the switching intervals of the time T. During the impedance matching interval 502, the controller of the wireless power receiver detects an envelope of the power received by the target resonator, estimates a distance between the source resonator and the target resonator, and matches the impedance of the target resonator based on the estimated distance.

In the switching waveform (d), the controller of the wireless power receiver controls a switch 540 ($SW_{RX}$) to be in an ON state during the power transmission intervals 501 and 503. During the impedance matching interval 502, the target resonator receives power from the source resonator during $\Delta T$ at the switching intervals of the time T, and the controller of the wireless power receiver detects a change in the power received by the target resonator, changes the operation mode of the wireless power receiver from the power transmission mode to the impedance matching mode, and controls the switch 540 to be in an OFF state. During the OFF state of the switch 540 of the wireless power receiver, the controller of the wireless power receiver detects an envelope of the power received by the target resonator, estimates the distance between the source resonator and the target resonator, and matches the impedance of the target resonator based on the estimated distance. When the controller performs the impedance matching during the OFF state of the switch 540, the accuracy of the impedance matching is enhanced compared to the impedance matching performed during the ON state of the switch 540 as illustrated in the switching waveform (c).

Figure 6A:
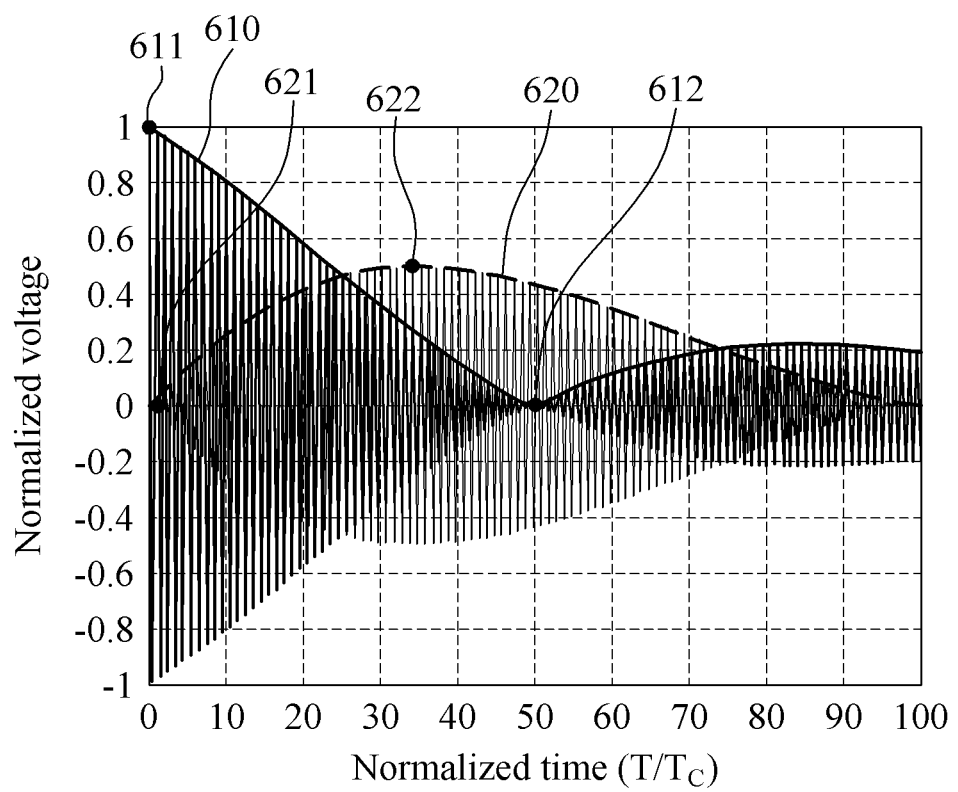
FIGS. 6A and 6B are graphs representing examples of estimating a distance between a source resonator and a target resonator.
Figure 6B:
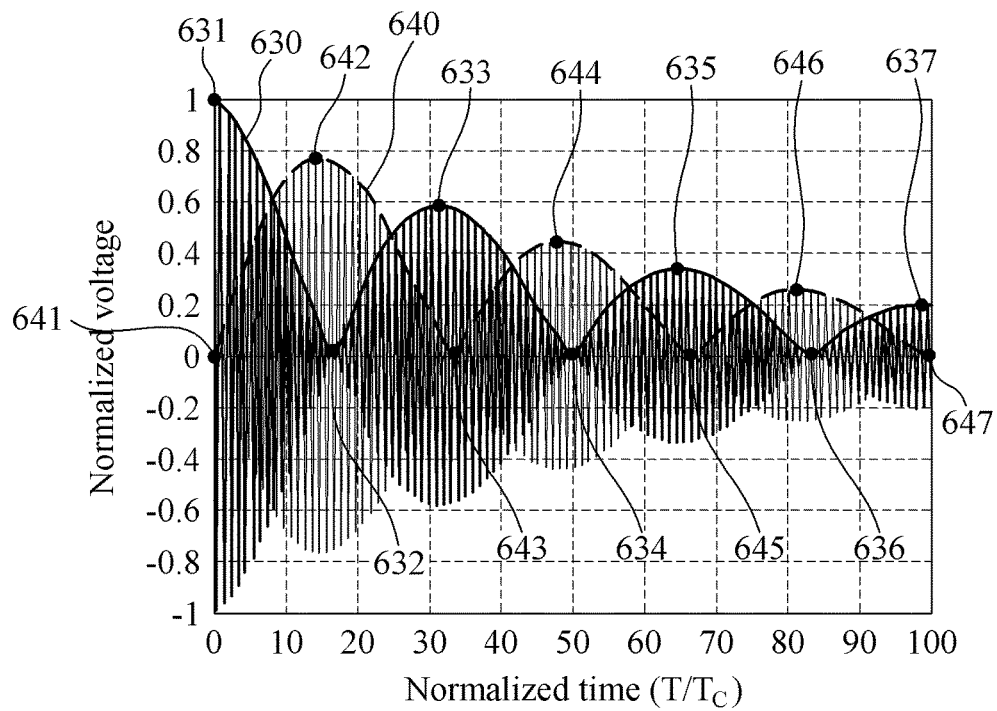

FIGS. 6A and 6B are graphs representing examples of estimating a distance between a source resonator and a target resonator.

In FIGS. 6A and 6B, a horizontal axis indicates time, a vertical axis indicates a magnitude of a voltage, and $T_C$ is a constant.

FIG. 6A illustrates examples of an envelope 610 of a voltage transmitted by a source resonator and an envelope 620 of a voltage received by a target resonator when a distance between the source resonator and the target resonator is great. A controller of a wireless power transmitter extracts a start point 611 and a minimum point 612 of the envelope 610, and calculates a time difference between the start point 611 and the minimum point 612. The controller of the wireless power transmitter includes information about a relationship between a coupling coefficient between the source resonator and the target resonator, and a time difference between at least two points of an envelope, and extracts the coupling coefficient between the source resonator and the target resonator based on the information about the relationship. The controller of the wireless power transmitter performs impedance matching based on the extracted coupling coefficient.

A controller of a wireless power receiver extracts a start point 621 and a peak point 622 of the envelope 620, and calculates a time difference between the start point 621 and the peak point 622. The controller of the wireless power receiver includes the information about the relationship between the coupling coefficient between the source resonator and the target resonator and the at least two points of the envelope, and extracts the coupling coefficient between the source resonator and the target resonator based on the information about the relationship.

FIG. 6B illustrates examples of an envelope 630 of a voltage transmitted by the source resonator and an envelope 640 of a voltage received by the target resonator when the distance between the source resonator and the target resonator is less than the distance between the source resonator and the target resonator in FIG. 6A.

The controller of the wireless power transmitter extracts at least two points from the envelope 630. For example, the controller of the wireless power transmitter extracts a start point 631, minimum points 632, 634, and 636, and peak points 633, 635, and 637, and calculates a time difference between the at least two points.

The controller of the wireless power receiver extracts at least two points from the envelope 640. For example, the controller of the wireless power receiver extracts a start point 641, peak points 642, 644, and 646, and minimum points 643, 645, and 647, and calculates a time difference between the at least two points.

The controller of the wireless power transmitter and the controller of the wireless power receiver include the information about the relationship between the coupling coefficient between the source resonator and the target resonator, and the at least two points of the envelope, and extract the coupling coefficient between the source resonator and the target resonator based on the information about the relationship.

Figure 7:
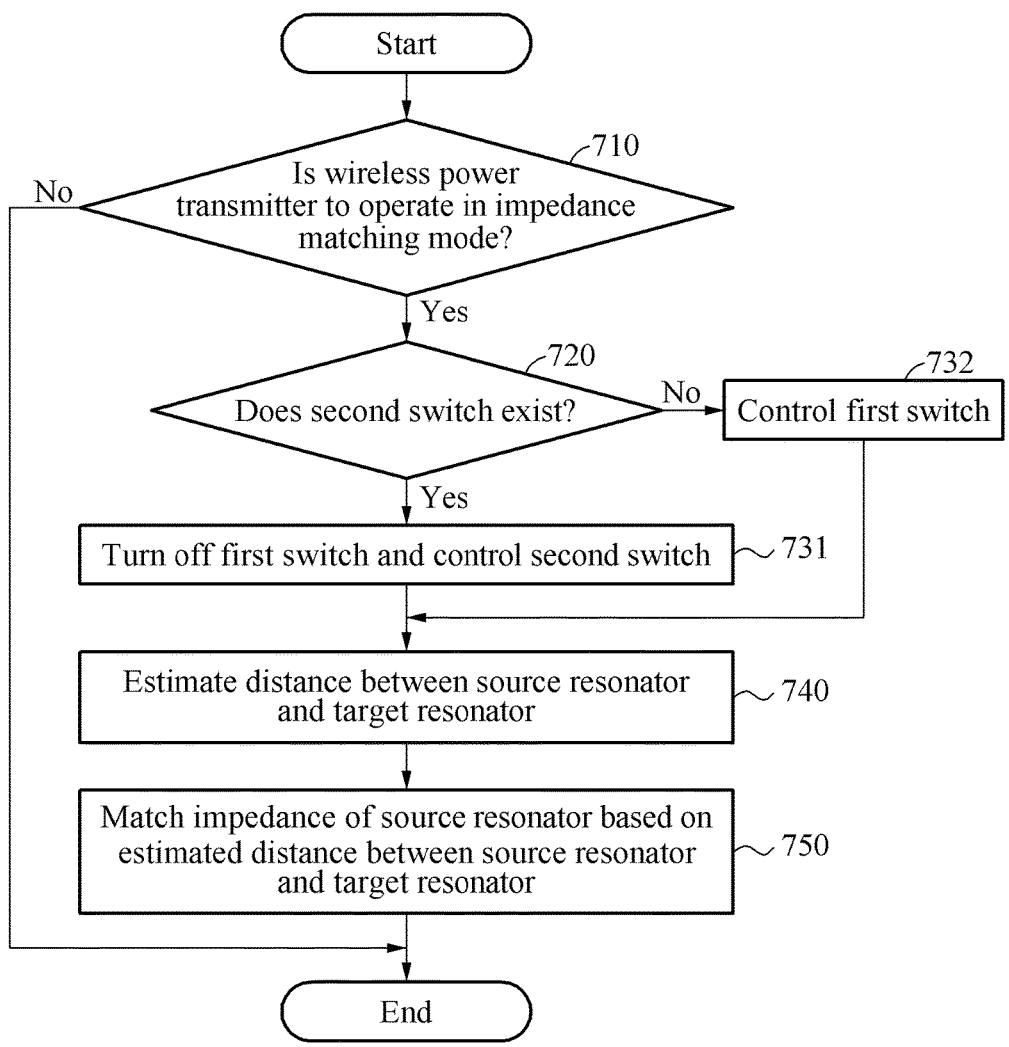
FIG. 7 is a flowchart illustrating an example of a method of impedance matching of a wireless power transmitter.

FIG. 7 is a flowchart illustrating an example of a method of impedance matching of a wireless power transmitter.

Referring to FIG. 7, in 710, the wireless power transmitter determines whether to operate in an impedance matching mode. In one example, the wireless power transmitter determines whether to operate in the impedance matching mode based on predetermined intervals or a predetermined power transmission efficiency.

In 720, when an operation mode of the wireless power transmitter is the impedance matching mode, the wireless power transmitter determines whether a second switch exists.

When the second switch is determined to exist, a controller turns OFF a first switch and controls the second switch in 731. When the second switch is determined not to exist, the wireless power transmitter controls the first switch in 732.

In the impedance matching mode, in response to the first switch or the second switch being controlled, power is supplied to a source resonator, and the source resonator performs mutual resonance with a target resonator.

In 740, the wireless power transmitter estimates a distance between the source resonator and the target resonator. The wireless power transmitter detects an envelope of power transmitted by the source resonator, and estimates the distance between the source resonator and the target resonator based on the envelope.

In 750, the wireless power transmitter matches an impedance of the source resonator based on the estimated distance between the source resonator and the target resonator.

The descriptions of FIGS. 1 through 6 are also applicable to the method of impedance matching of the wireless power transmitter illustrated in FIG. 7, and thus will not be repeated for conciseness.

Figure 8:
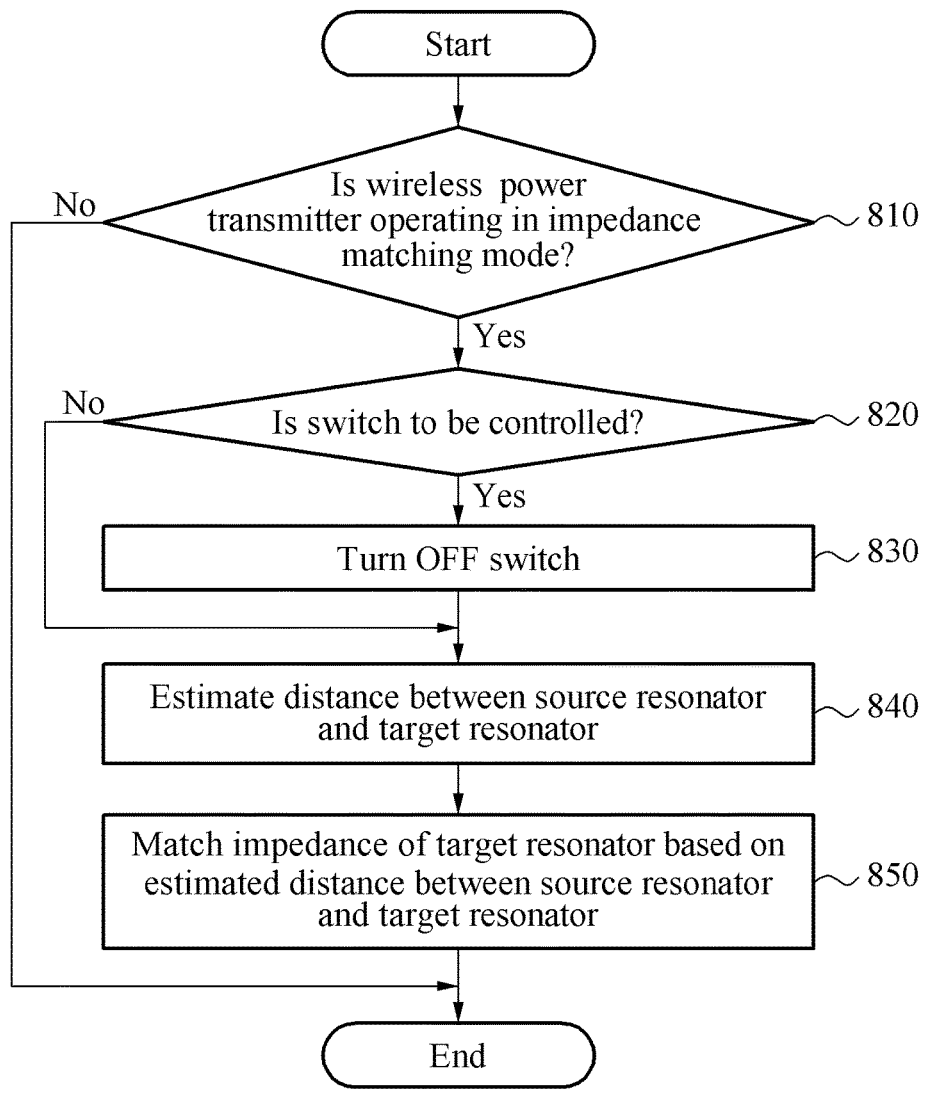
FIG. 8 is a flowchart illustrating an example of a method of impedance matching of a wireless power receiver.

FIG. 8 is a flowchart illustrating an example of a method of impedance matching of a wireless power receiver.

Referring to FIG. 8, in 810, the wireless power receiver determines whether a wireless power transmitter is operating in an impedance matching mode. A magnitude and intervals of power transmitted by the wireless power transmitter may change depending on an operation mode of the wireless power transmitter. The wireless power receiver determines the operation mode of the wireless power transmitter based on a change in power received by a target resonator from a source resonator, and sets an operation mode of the wireless power receiver to correspond to the operation mode of the wireless power transmitter.

In 820, the wireless power receiver determines whether a switch is to be controlled. When it is determined that the switch is to be controlled, the wireless power receiver turns OFF the switch in 830.

In 840, the wireless power receiver estimates a distance between the source resonator and the target resonator. The wireless power receiver detects an envelope of the power received by the target resonator, and estimates the distance between the source resonator and the target resonator based on the envelope.

In 850, the wireless power receiver matches an impedance of the target resonator based on the estimated distance between the source resonator and the target resonator.

The descriptions of FIGS. 1 through 7 are also applicable to the method of impedance matching of the wireless power receiver illustrated in FIG. 8, and thus will not be repeated for conciseness.

The controller 120, the envelope detector 121, the distance estimator 122, and the impedance matcher 123 illustrated in FIG. 1; the controller 240, the envelope detector 241, the distance estimator 242, and the impedance matcher 243 illustrated in FIG. 2; and the controller 320, the envelope detector 321, the distance estimator 322, and the impedance matcher 323 illustrated in FIG. 3 that perform the operations described herein with respect to FIGS. 1-8 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 7 and 8 that perform the operations described herein with respect to FIGS. 1-8 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter comprising:
   a source resonator configured to transmit wireless power by resonating with a target resonator;
   a first power supply configured to supply power to the source resonator;
   a first switch configured to turn ON/OFF a connection of the source resonator to the first power supply, wherein the source resonator is isolated in response to the first switch turning OFF; and
   a controller configured to match an impedance of the source resonator by estimating a distance between the source resonator and the target resonator.

2. The wireless power transmitter of claim 1, wherein the controller is further configured to control the wireless power transmitter to operate in a power transmission mode and an impedance matching mode.

3. The wireless power transmitter of claim 2, wherein the controller is further configured to control a supply of power to the source resonator by controlling the first switch in the impedance matching mode.

4. The wireless power transmitter of claim 2, further comprising:
a second power supply configured to supply power to the source resonator; and
a second switch configured to turn ON/OFF a connection of the source resonator to the second power supply;
wherein the controller is further configured to control a supply of power to the source resonator by controlling the second switch in the impedance matching mode.

5. The wireless power transmitter of claim 2, wherein the controller comprises:
an envelope detector configured to detect an envelope of the wireless power transmitted by the source resonator in the impedance matching mode;
a distance estimator configured to estimate a distance between the source resonator and the target resonator based on the envelope; and
an impedance matcher configured to match the impedance of the source resonator based on the estimated distance.

6. The wireless power transmitter of claim 5, wherein the distance estimator is further configured to estimate a coupling coefficient or a mutual inductance between the source resonator and the target resonator based on a time difference between at least two points of the envelope.

7. The wireless power transmitter of claim 6, wherein the at least two points comprise at least two of:
at least one peak point at which an amplitude of the envelope reaches a peak;
at least one minimum point at which the amplitude of the envelope reaches a minimum; and
a start point at which the source resonator and the target resonator start the resonating in the impedance matching mode.

8. The wireless power transmitter of claim 2, wherein the controller is further configured to control the wireless power transmitter to operate in the impedance matching mode based on predetermined intervals or a predetermined power transmission efficiency.

9. The wireless power transmitter of claim 2, wherein the controller is further configured to end the impedance matching mode in response to the resonating of the target resonator and the source resonator being suspended in the impedance matching mode.

10. The wireless power transmitter of claim 2, wherein the controller is further configured to match the impedance of the source resonator in the impedance matching mode based on a resonance frequency between the source resonator and the target resonator in the power transmission mode.

11. A wireless power receiver comprising:
a target resonator configured to receive wireless power by resonating with a source resonator;
a load configured to receive power from the target resonator; and
a controller configured to match an impedance of the target resonator by estimating a distance between the source resonator and the target resonator,
wherein the controller is further configured to estimate the distance based on an envelope of the wireless power received by the target resonator.

12. The wireless power receiver of claim 11, wherein the controller is further configured to control the wireless power receiver to operate in a power transmission mode and an impedance matching mode.

13. The wireless power receiver of claim 12, wherein the controller is further configured to control the wireless power receiver to operate in the impedance matching mode in response to a change in the wireless power received by the target resonator.

14. The wireless power receiver of claim 12, further comprising a switch configured to turn ON/OFF a connection of the target resonator to the load;
wherein the controller is further configured to turn OFF the switch in the impedance matching mode.

15. The wireless power receiver of claim 12, wherein the controller comprises:
an envelope detector configured to detect the envelope of the wireless power received by the target resonator in the impedance matching mode;
a distance estimator configured to estimate the distance between the source resonator and the target resonator based on the envelope; and
an impedance matcher configured to match an impedance of the target resonator based on the estimated distance.

16. The wireless power receiver of claim 15, wherein the distance estimator is further configured to estimate a coupling coefficient or a mutual inductance between the source resonator and the target resonator based on a time difference between at least two points of the envelope.

17. The wireless power receiver of claim 16, wherein the at least two points comprise at least two of:
at least one peak point at which an amplitude of the envelope reaches a peak;
at least one minimum point at which the amplitude of the envelope reaches a minimum; and
a start point at which the source resonator and the target resonator start the resonating in the impedance matching mode.

18. A wireless power transmitter comprising:
a source resonator configured to transmit wireless power by resonating with a target resonator in response to power supplied to the source resonator;
a switch configured to interrupt the power from being supplied to the source resonator; and
a controller configured to match an impedance of the source resonator based on an envelope of the wireless power transmitted by the source resonator in response to the switch interrupting the power from being supplied to the source resonator.

19. The wireless power transmitter of claim 18, wherein the controller is further configured to control the switch not to interrupt the power from being supplied to the source resonator during a power transmission mode, control the switch to interrupt the power from being supplied to the source resonator during an impedance matching mode, and match the impedance of the source resonator during the impedance matching mode.

20. The wireless power transmitter of claim 19, wherein the controller is further configured to control the switch to interrupt the power from being supplied to the source resonator a plurality of times during the impedance matching mode.

21. The wireless transmitter of claim 18, wherein the controller is further configured to estimate a coupling coefficient or a mutual inductance between the source resonator and the target resonator based on a time difference between two points of the envelope, and match the impedance of the source resonator based on the estimated coupling coefficient or mutual inductance.

22. The wireless transmitter of claim 21, wherein the time difference changes as a distance between the source resonator and the target resonator changes.

23. The wireless transmitter of claim 21, further comprising a lookup table (LUT) storing a relationship between the coupling coefficient or the mutual inductance and the time difference;
   wherein controller is further configured to estimate the coupling coefficient or the mutual inductance by looking up the time difference in the LUT, and reading out a coupling coefficient or a mutual inductance corresponding to the time difference from the LUT.

24. A wireless power receiver comprising:
   a target resonator configured to receive wireless power by resonating with a source resonator; and
   a controller configured to match an impedance of the target resonator based on an envelope of the wireless power received by the target resonator, control a switch not to interrupt the power from being received by a load during a power transmission mode, control a switch to interrupt the power from being received by the load during an impedance matching mode, and match the impedance of the target resonator during the impedance matching mode.

25. The wireless transmitter of claim 24, wherein the controller is further configured to estimate a coupling coefficient or a mutual inductance between the source resonator and the target resonator based on a time difference between two points of the envelope, and match the impedance of the target resonator based on the estimated coupling coefficient or mutual inductance.

26. The wireless transmitter of claim 25, wherein the time difference changes as a distance between the source resonator and the target resonator changes.

27. The wireless transmitter of claim 25, further comprising a lookup table (LUT) storing a relationship between the coupling coefficient or the mutual inductance and the time difference;
   wherein controller is further configured to estimate the coupling coefficient or the mutual inductance by looking up the time difference in the LUT, and reading out a coupling coefficient or a mutual inductance corresponding to the time difference from the LUT.

* * * * *